Oct. 14, 1941.  G. M. DARBY ET AL  2,259,221
PURIFICATION OF LIQUIDS
Filed Dec. 30, 1939  2 Sheets-Sheet 1

INVENTORS
GEORGE M. DARBY,
ANTHONY J. FISCHER,
WILLIAM C. WEBER,
BY
ATTORNEY.

Oct. 14, 1941.   G. M. DARBY ET AL   2,259,221
PURIFICATION OF LIQUIDS
Filed Dec. 30, 1939   2 Sheets-Sheet 2

INVENTORS
GEORGE M. DARBY,
ANTHONY J. FISCHER,
BY WILLIAM C. WEBER,

Patented Oct. 14, 1941

2,259,221

UNITED STATES PATENT OFFICE 2,259,221

PURIFICATION OF LIQUIDS

George M. Darby, Westport, Conn., Anthony J. Fischer, Flushing, N. Y., and William C. Weber, Westport, Conn., assignors to The Dorr Company, Inc., New York, N. Y., a corporation of Delaware Application December 30, 1939, Serial No. 311,840

6 Claims. (Cl. 210—16)

This invention relates to the removal of chemical precipitates from suspension in their mother liquor or other liquid but in practicing the invention, it may also relate to the control of the chemical reaction from which the precipitate results. The invention is usable in the softening of water, as an example, although it is capable of other uses.

In the softening of water, for instance, it has been customary to treat it in a reaction chamber where an added chemical reacts with the hardness of the water to cause a precipitate which will thus leave the water free from dissolved impurities. The next step usually is to remove the water with its precipitate that is in suspension to a separate settling basin where the precipitate is settled in the form of sludge, and the clear water decanted from the settler.

The combining of these steps into one apparatus, is an object of this invention so that the reaction zone and the settling zone can function in a unitary vessel. However, as the reaction zone involves agitation while the settling zone involves quiescence, provision has heretofore been made for positive means to keep the agitation of one zone from interfering with quiescence in the other, and vice versa. In other words, it was previously thought that this required structural means to separate the two antagonistic zones, whereas it is a primary object of this invention to accomplish the effect of separating these two zones functionally without the necessity of partitions, walls, trays, or other such elements.

The invention is based upon the discovery that in a vessel having a lower zone of agitation to which liquid to be treated is fed and a zone of relative quiescence from which clarified liquid is released or decanted and which is superposed with respect to the lower agitated zone, suspended solids will tend to remain in the agitated zone and not migrate or roil up therefrom upwardly into the non-agitated zone provided sufficient concentration of agitated suspended solids is maintained in the agitated zone. However, since solids progressively accumulate in the agitated zone, means must be provided for removing such accumulations but such means must be so arranged that it will be impossible normally for an operator to draw off suspended solids from that zone to a level below that above which it is not desired to have the solids migrate upwardly.

Agitation in the agitated subnatant zone is necessary for bringing the reactant constituents into mutual contact whereby reaction can take place to produce the desired precipitation. However, in view of the importance of avoiding migration or roiling of the suspended solids of the subnatant zone upwardly into the supernatant zone, it becomes another object of this invention to use a type of agitation in the agitated reaction zone that encourages horizontal motion of the suspended solids while discouraging vertical motion. This is accomplished by the use of substantially vertically disposed blades or paddles movable about a substantially vertical axis wherein the blades are positioned angularly to their direction of movement. This causes suspended solids encountered by the moving blades to be deflected horizontally without any tendency to give them any vertical impulse.

Since the agitated subnatant zone is in effect a reaction zone where the reactant constituents are brought together, and whereas in that zone there is maintained a high concentration of suspended solids for preventing upward migration of them, it is proposed by this invention to make use of these facilities for effecting reaction to yield a reaction product that lends itself well to the type of liquid-solids separating apparatus used in the practice of this invention.

Precipitated products of chemical reaction differ widely in type ranging from gelatinous, through curdy, and pulverulent to crystalline. As applicable to the present invention, it is only of interest to note that some of the reaction products are flocculatable, while others are coagulatable. An important distinction here is that if the reaction product is a crystal, the crystals as yielded by the reaction can be controlled to be readily settleable by the size of crystal grown or by aggregating grains of crystals together, or by both. Flocculatable precipitates are coagmented into flocs that are caused by bringing floccules together in such a manner that their tufts or fibers interlock into a mass. Another way of distinguishing these two main types of precipitates is to say that one is crystalline while the other is amorphous. Therefore, in integrating the precipitates into colonies of solids and conditioning them for settleability, if the precipitate is amorphous, the agitating blades in the agitated reaction zone must be moved at a flocculating speed (not to exceed 1.5 feet per second) so that the flocs are not disintegrated after once being coagmented, whereas if the precipitate is crystalline, then a much higher speed can be used.

For instance, in the softening of water and the like, hardness is of two types. One is temporary and can be remedied by treatment with lime. The other is permanent and must be treated with some stronger agent, such as soda. But in both cases, the chemical or reagent used is reactive with the hard content of the water to form with it a solid phase reaction product that is settleable. This reaction product is crystalline, in which case it is another object of this invention to control the growth of these reaction crystals to effect generally the production of few but larger crystals instead of the normally produced multitude of tiny crystals. So to that end, it is desired to make use of Van Weimarn's law in the practice of this invention.

That is, our objective is to pass the incoming water through a maintained high concentration or mobile suspension of previously formed reaction crystals and then to supply the reagent directly to that suspension for thereby causing the newly precipitated matter to grow on existing crystals rather than to develop into new crystals. By maintaining a dense concentration, a maximum of surface area is exposed to the reagent and maximum interfacial contact is thus assured with its consequent benefit of mass action. If the reagent were supplied to the incoming water, this result would not be obtained, and moreover there would be a tendency for encrustations to form in the feed pipe.

Under some circumstances, where it is only the hardness of the water that is to be treated, the apparatus of our invention may function solely as a softener, in which case, the lower zone of the tank will operate as a mixer or agitated zone, and as such higher speeds of the moving blades are permissible. Under other circumstances, where it is only the turbidity of the water to be obviated, the apparatus of our invention may function generally as a clarifier, in which case, the lower zone of the tank will operate as a flocculation zone, but as such the speed of the blades should not be high enough to disrupt the fragile flocs. And under still other circumstances, both hardness and turbidity are to be removed, in which case the lower zone of our tank will operate both as a reaction and as a flocculation zone, and as such flocculating speeds of the moving blades are preferably used. Indeed, the the latter is often the case even where only softening is aimed at because while in softening, our objective is to control crystal size and growth, in practice it cannot be done absolutely with the result that some of the crystals resulting from precipitation will be of such a small size as to be in effect particles of turbidity which it is desirable to flocculate. Therefore, we shall use herein the term agglomeration as generically covering both flocculation and crystal aggregation.

As agglomeration takes place, it yields continually integrated particles in all stages of settleability. Continued agitation unaccompanied by withdrawal of accumulated sediment from the reaction zone, conditions these integrated particles into colonies and builds up a concentration of them in that zone until the blades or paddles are completely submerged in that concentration or suspension which in effect is a blanket of sludge, if not almost a slurry. Once the blanket has reached a level above the moving blades, then further accumulations can be withdrawn from their zone so long as the blades are maintained submerged in the sludge blanket. But it is important to control the drawing off of sludge so that the blades are never uncovered by the blanket, and it is advantageous to provide means automatically operating to maintain a minimum level.

The unexpected result of this arrangement is that because of the relatively dense concentration attained in the reaction zone, the sludge blanket seems to dampen off swirls or eddies of that zone that would otherwise roll, rise or migrate into the quiescent settling zone superposed on the reaction zone and thereby disrupt its necessary quiescence. But while maintaining free and unrestricted hydraulic communication between these contiguous superposed zones of liquid, there is in effect no disadvantageous disturbance of the quiescence of the liquid of the superposed top zone by agitation from the liquid of the underlying reaction zone, or interference with the agitation of the latter by the quiescence of the supernatant zone. This is an illogical action. But the fact remains that it does take place.

It has of late been considered necessary to provide the settling zone with raking blades for mechanically cleaning the bottom of the settler by impelling sediment to discharge, but since the settling zone of our invention has no mechanical bottom, rakes are not needed in it.

We find that we can maintain a concentration in the sludge blanket in the reaction zone up to the order of from 4 to 5% solids. When such a blanket is maintained, agglomeration is even more effective than when a lesser concentration is available and the blanket seems to entrap and discourage any suspended solids from migrating upwardly into the top zone in spite of absence of mechanical deterrence. Indeed, in operation the turbidity seems to reach only to the top of the blanket and from there up practically clear water is observed, and there is a defined break-line between the blanket and clear water. It is this tendency of the suspended solids not to migrate from the reaction zone into the top zone that is so startling and is the foundation on which this invention is based.

What seems to happen is that there is established immediately above and contiguous to the agitated reaction zone, a zone of sedimentation or settling. The latter is in the upper zone of the sludge blanket and may fluctuate with the rise and fall of the top limit of the sludge blanket. This statement applies so long as the uppermost portion of the sludge blanket is sufficiently above the agitating blades of the agitation or reaction zone for the upper region of the sludge blanket not to be disturbed unduly by the disturbance resulting from the blades. This makes the maintenance of the minimum top level of the sludge blanket so important. Enough depth of top zone or clear water storage zone is provided to assure a sludge storage space or fluctuation space so that between sludge draw-offs, the top limit of the sludge blanket will never reach as high as the level of the overflow weir over which the clear water is decanted.

The invention, therefore, is based upon the discovery that if a sludge blanket is interposed between an underlying reaction zone and an overlying clear water zone, no mechanical divisions are needed between the zones for there is a break-line between the turbidity of the sludge blanket and the clear water zone, even though the two zones are actually contiguous in superposed relationship.

Whereas, in the foregoing mention has been made of moving blades for contributing to agglomeration in the bottom or reaction zone of the tank, it has been found that in this functioning, some types of blades are more effective than others. The best known to us are sets of blades that are V-shaped in cross-section, and that are vertically disposed in substantial parallelism to the general flow-path of the liquid passing through the tank. This means that in the embodiment of our invention shown herein the blades are vertically disposed since the liquid is fed to the tank at its bottom and overflowed from its top. The apex of the V of the blades point in the direction of movement of the blades so that the wings or legs of the V are angularly disposed to the path of movement of the blades, whereby suspended solids encountered by the blades are given a lateral deflection in a more or less horizontal plane. It is found additionally desirable to associate with such sets of primary moving blades, sets of secondary similarly shaped vertical blades that are oppositely directed with respect to the apex of the V and that are either (1) fixed or (2) move at a differential rate or direction from the primary moving blades. The primary moving blades seem to deflect suspended solids horizontally into contact with the secondary blades whereupon these solids are reflected in yet another horizontal direction. It is this stimulation of a maximum horizontal meandering of the solids with a minimum of vertical motion that yields such effective coagmentation, and for that reason we recommend it for use in the preferred manner of practicing our invention.

This invention is illustrated in the accompanying drawings which disclose that embodiment of our invention which is best known to us just now. But the embodiment is to be taken only as illustrative of other possible embodiments so for the metes and bounds of this invention attention is directed to the appended claims.

In said drawings—

Figure 1:
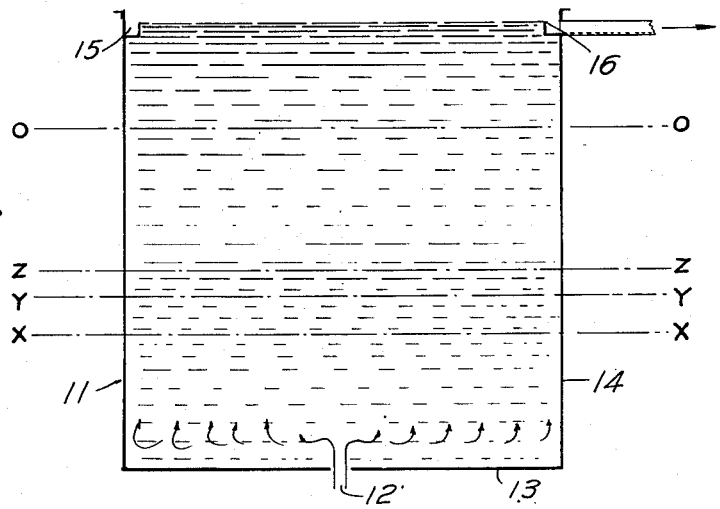
Fig. 1 is a view diagrammatically illustrating features and steps important for realizing and performing the invention.

Reference is now made to the drawings in detail:

A tank or basin 11 is provided for receiving liquid supplied thereto for treatment therein through the medium of suitable feeding means collectively designated as 12. This feeding means is constructed for continually delivering and for distributing the liquid supplied thereto into and relatively uniformly throughout the lower cross-section of the tank.

The tank 11 comprises a bottom 13 and a marginal wall 14 rising therefrom. This marginal wall is preferably of cylindrical form. The tank has at the upper portion thereof an outflow launder 15 providing an effluent conduit leading from the tank. An overflow weir 16 of this launder determines the normal operative surface level of the body of solution of liquid undergoing treatment within the tank. The tank also is provided with suitable drainage means, as for example, a valve controlled pipe or conduit 17 leading from the lower interior portion of the tank.

There is also associated with the tank a carrying structure or platform 18 stationary with respect to the tank and provided for supporting mechanism which operates within the tank. In the construction shown this supporting structure embodies parallel horizontal beams 19 resting upon and secured to the marginal wall of the tank.

The feed means 12 heretofore referred to comprises a feed pipe 21 embodying a stationary delivery section 22 leading to and delivering into a turnable terminal member 23 having outwardly-extending tubular arms 24 leading therefrom and disposed within the lower regions of the tank. The tubular arms 24 have flow-discharge orifices or slotted portion 25 disposed lengthwise thereof whereby the feed is discharged into the tank. The turnable section 23 and the tubular arms extending therefrom move in closed horizontal paths about a vertically-extending axis concentric with the tank, and during this movement distributes the feed liquid relatively uniformly within and throughout a lower horizontal section of the tank.

In this general connection it is to be noted that the stationary feed section 22 and the turnable member 23 have juxtaposed position, are cylindrical in horizontal cross-section and are disposed in overlapping relationship with a sufficiently close joint between them to provide for the upflow of liquid from the stationary section 22 into the turnable member 23 and whereby there is no substantial leakage of liquid through any space left between them. This turnable member 23 derives support from a vertical shaft 27 which in turn is dependably supported from a horizontally-turnable bearing member 28 that is mounted on a stationary bearing 29 that is mounted upon and carried by the stationary supporting structure 18 or by the horizontal beams 19 of said structure. Suitable motor actuated means 20 comprising speed reducer and power transmission gearing is provided on the platform for imparting the horizontal turning movement to said bearing member 28 and the parts carried therefrom. The turnable bearing member 28 and the motor actuated means 20 thereupon embody features of construction typified by those shown in the Scott U. S. Patent No. 2,087,725, granted July 20, 1937. Since such type of construction for supporting and turning a depending vertical shaft is old, further description in respect to the means for supporting and turning shaft 27 will not be incorporated herein.

Within an intermediate region or lower half of the tank there is provided a horizontal support 30, the ends of which are secured as through the medium of angle irons or connecting plates 31 to the walls of the tank. For convenience this support 30 may be referred to as an intermediate beam. It is relatively rigid and is disposed in alignment with or in the region of the diameter of the tank. This member 30 constitutes not only a support for a vertical load carried thereby but also serves as a strut or brace for absorbing or resisting lateral or horizontal forces. Thereto there is secured a suitable bearing member 32 which functions as a steady bearing for an intermediate and relatively low portion of the vertical shaft 27. The vertical shaft has a collar 33 secured thereto below said steady bearing but in a position vertically spaced with respect to said distributing arms 24, to wit, at an elevation substantially above that of the distributing arms 24. Collar 33 provides fixed ears or lugs 34. The distributing arms 24 are also provided with ears or lugs 35. Tie rods 36 which are adjustable as to length because of turnbuckles 37 incorporated therein, are provided as tension members between the ears or lugs 34 and 35 so as to support the outer ends of the distributing arms in adjusted position and against downward deflection and whereby the distributing arms 24 may function as carrier arms for the movable agitating blades 38, 39 and 40. These agitating blades are horizontally spaced relative to each other and extend vertically with the major portion thereof rising from said arms. The discharge orifices 25 of these distributing arms are disposed on the trailing side thereof. The movable agitating blades just referred to are disposed at the forward side of the arms as is clearly shown in the plan view hereof. These blades are V-shaped in cross-section with the apex portion of the V foremost. The sides of the V-shaped portion are relatively straight so as to provide flat or even side surfaces. The rear of the V-shaped portion of the movable agitating blades is open.

Vertically-extending baffle members 41, 42, 43 and 44 are secured to and depend from the stationary intermediate beam 30. These stationary baffles are horizontally spaced and are disposed for receiving and permitting the passage of the agitating blades as they move forward in their horizontal closed paths about the vertical axis of the shaft 27. These stationary baffles are preferably V-shaped in horizontal cross-section and the apex of the V may be referred to as being rearwardly disposed. The forwardly disposed sections of the V-shaped portions are preferably left open. The sides of the V-shaped portions are straight whereby the face portions are flat or even.

A sludge-withdrawal means is provided. This is collectively designated as 45 and it comprises a pocket member 46 open at the top that is preferably disposed about the axial center of the tank and within the upper portion of the lower half of the tank. This pocket member 46 is supported from the fixed beam 30 through the medium of depending strips 47. This member 46 is in the form of an annulus and comprises an inner tube providing a section 50 immediately surrounding the shaft 27, a small flat floor portion 51 extending from the lower end of the inner tube 50, a conical portion 52 flaring upwardly and outwardly from the flat floor portion, and a cylindrical rim 53 rising from the conical portion and provided at the upper end or edge thereof with a submerged weir 54, which should be at an elevation at least as low and preferably slightly lower than the elevation of the upper end portion of the inner tubular section 50.

A scraping mechanism 55 is provided for operating within and over the floor and conical portions of the sludge pocket 46. This scraping mechanism comprises a horizontal yoke or carrier bar 56 that is secured to the shaft 27 and raking elements 57 depending from said carrier bar. Sludge is withdrawn or passed from the lower portion of this pocket through the medium of this sludge pipe 58 that is in communication with the interior of the pocket and which leads to the exterior of the tank.

The upper ends of the agitating blades 38 are disposed relatively uniformly along a horizontal broken line X—X and this line may be viewed as practically indicating the uppermost limits of an agitation zone wherein there is effected an agitating or agglomerating or agitating and agglomeration of material within the liquid whereby there is further as the case may be, chemical reaction; the formation, development or agregating of crystals or crystal growth; the formation, development or coagmentation of floc nuclei or flocs, the creation and maintenance of a condition leading to a relatively high density because of a developed solids content within the agitation zone; or even the amassment of flocs into floc colonies.

In order to realize the advantageous features referred to, the several agitating or agglomerating blades travel forwardly along their closed horizontal paths of movement.

The marginal weir edge or submerged weir 54 of the sludge withdrawal means is located at an elevation higher than that of the horizontal broken line X—X. The elevation of the upper edge of the submerged weir 54 is indicated by the broken line Y—Y. This line Y—Y also indicates the lowest limits to which the sludge can be drawn by the sludge withdrawal means 45.

It is important that there shall be no withdrawal of sludge down to a point as low as that of the upper end of the movable paddles, or as otherwise expressed, down to or approximately as low as that of the upper limits of the zone of agitation. It is advisable that they be constantly maintained or that there be left a substantial portion or depth of sludge blanket above the upper ends of these movable agitating blades.

In the performing of the invention, particularly in connection with liquids requiring chemical treatment or dosing as by chemicals supplied for effecting chemical reactions or requiring dosing with materials frequently referred to as coagulants, it is advisable to introduce the reactive chemical or coagulant into the very body of the agitation zone and to that end there is provided dosing means comprising piping 62 having the terminal or discharge end 63 thereof disposed well within the zone of agitation. This pipe derives support from the intermediate beam 30 and, of course, is so disposed as not to interfere with the movable blades or agitating paddles.

In the normal operation of the apparatus there is a sludge blanket which extends from the very bottom of the tank preferably substantially above that of the intermediate beam, to wit, into a region generally as high as that indicated by the broken line Z—Z, or even to a locality as high as that indicated by the broken line O—O.

The vertically-extending baffle members 41, 42, 43, etc., function as anti-swirling devices and also as deflector or reflector members for imparting horizontal deflecting or reflecting flow movements to the liquid having engagement therewith. These deflector members or blades may also function to divide flow currents engaging therewith.

As a matter of fact there is a substantial line of demarcation, or that which may be referred to as a break-line between the sludge blanket referred to herein and the supernatant liquid, the latter of which is relatively clear and progressively overflows the weir 16 as the process is carried out. The horizontally-extending broken lines Z—Z and O—O are indicative of that which should be viewed as the normal approximate minimum and maximum operating heights for the sludge blanket, or as otherwise expressed, for the sharp lines of demarcation between the subnatant sludge blanket on the one hand and the relatively clear supernatant liquid on the other hand. All this is indicated in and brought out by the diagrammatic figure which will be presently referred to.

The main points to be considered and constantly borne in mind by the operator are these:

(a) The lower surface limit of the sludge blanket should never go below the elevation indicated by the horizontal line Y—Y and the minimum elevation for the top of the sludge blanket is approximately at an elevation indicated by the horizontal line Z—Z;

(b) There should be left or maintained sufficient depth of clear supernatant below the weir edge 16 of the effluent launder whereby the process can be carried out without undue attention on the part of the operator; in other words, to prevent the sludge from building up or rising to a point where it will overflow the weir edge. The maximum elevation for the surface of the blanket is preferably not higher than that of the elevation indicated by the horizontal broken line O—O.

The diagrammatic Fig. 1 is primarily employed tersely to illustrate and at the same time vividly bring out the functional characteristics of the apparatus and the steps employed in connection with the invention hereof.

Assume or consider that the apparatus has been placed in condition for normal operation. When in this condition the tank is filled with the liquid up to the level of the overflow weir. This liquid tank content embodies an established and maintained section of sludge in the lower portion thereof and a relatively clear supernatant liquid section extending from the top of the underlying sludge up to the level of the overflow weir. There is a marked line of division or definition between the subnatant section of sludge on the one hand and the relatively clear supernatant liquid on the other hand.

The normal operation of the apparatus or performing of the process carried out therein, involves the following steps or operations:

In the lower or agitated zone to which fed liquid is supplied, suspended solids are allowed to concentrate until such a concentration is reached that a sludge blanket is realized dense enough to substantially prevent solids from migrating upwardly into the supernatant clear zone. Thereafter, liquid is continually supplied for treatment into the already established sludge body within the lower portion of the tank. The thus supplied liquid is distributed in a relatively uniform manner by any suitable liquid feeding and discharge means such as through distributing orifices 25 provided in the horizontally-movable tubular arms 24 of Figs. 2 and 3.

Mechanically agitated horizontal flow movements are created within and across the lower portion of the tank by horizontally movable agitating blades, sometimes referred to herein as agglomerating blades. These blades are horizontally spaced, extend vertically and are mounted on or are carried by a suitable carrier that is turnable in closed horizontal paths about the vertical axis and are constructed so as to impart substantially horizontal flow movements to the liquid-solids mass or sludge engaged thereby. These agitating blades are provided by horizontally-movable vertically-extending blades that are V-shaped in cross section and which are designated as 38, 39, etc. in Figs. 2 and 3. The broken line X—X indicates the approximate locality of the upper ends of these blades. It also designates substantially the upper limits of the agitation zone.

The horizontally impelled liquid is reflected, deflected and to a certain extent divided by suitable baffle means comprising vertically-extending bladed members disposed for horizontally reflecting or deflecting liquid impelled against them by the movable agitating blades. The deflector members are provided by horizontally-spaced vertically-extending baffles that are V-shaped in cross section and which are designated as 41, 42, etc., in Figs. 2 and 3. A suitable support is provided for these deflector baffles. These deflector baffles constitute anti-swirling members and directly oppose any tendency for horizontal rotation of the entire body of liquid-solids suspension that might otherwise be set up incident to the horizontal turning movement of the agitating blades.

Some suitable reactive chemical or dosing coagulant, the type employed being according to the operative requirements or according to the end to be accomplished, is supplied to and delivered into the zone served by the agitating blades, to wit, substantially down in the zone the upper limit of which is designated by the line X—X. In this zone, which is a reaction zone as well as a zone of agitation, there exists a liquid-solids suspension wherein the concentration is of the order of from 4% to 5% solids; in fact, this concentrated liquid-solids section extends not only to the upper margins of the zone of agitation, but also for a substantial distance above the agitation zone, preferably to a region in which the normal minimum and maximum heights are approximately indicated by the lines Z—Z and O—O. In other words, the sludge body extends to such a height that there is left a substantial depth of sludge above the zone of agitation, to wit, in a zone which may be referred to as a quiescent sedimentation or settling zone. It may be viewed as a separating-out zone wherein left-behind or settled solids are freed from the liquid flowing upwardly within the tank.

Figure 2:
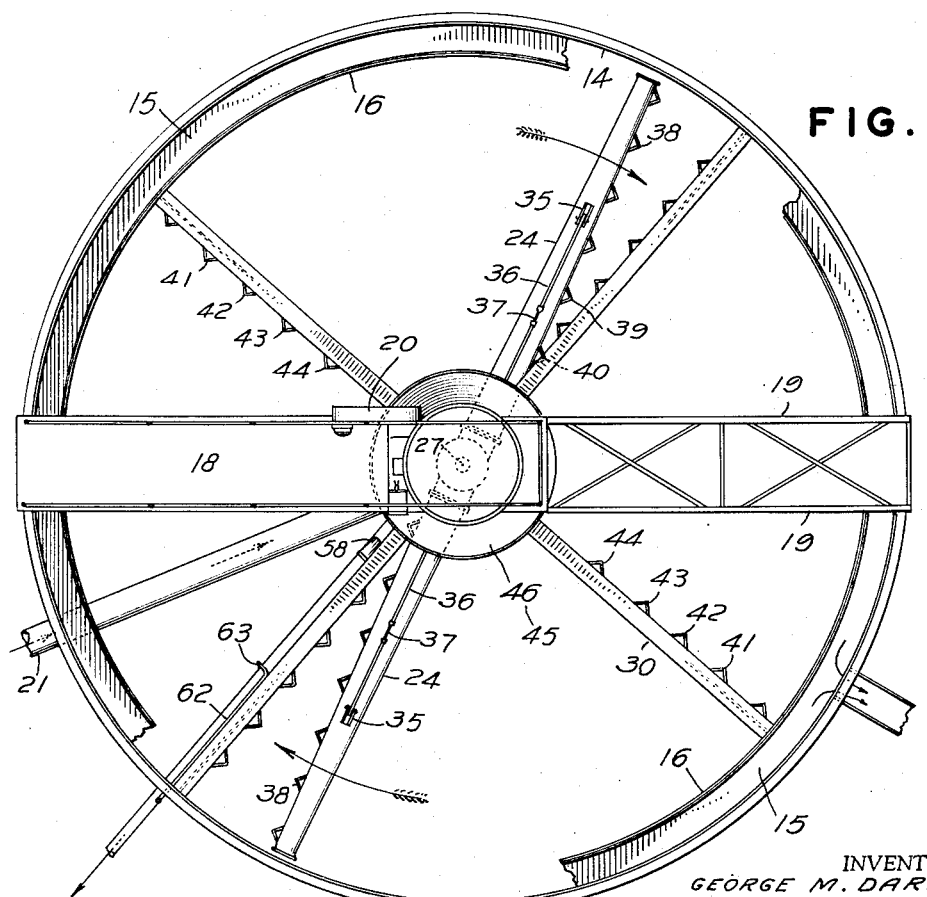
Figs. 2 and 3 are respectively plan and vertical sectional views of an apparatus wherein and by which the invention is realized.
Figure 3:
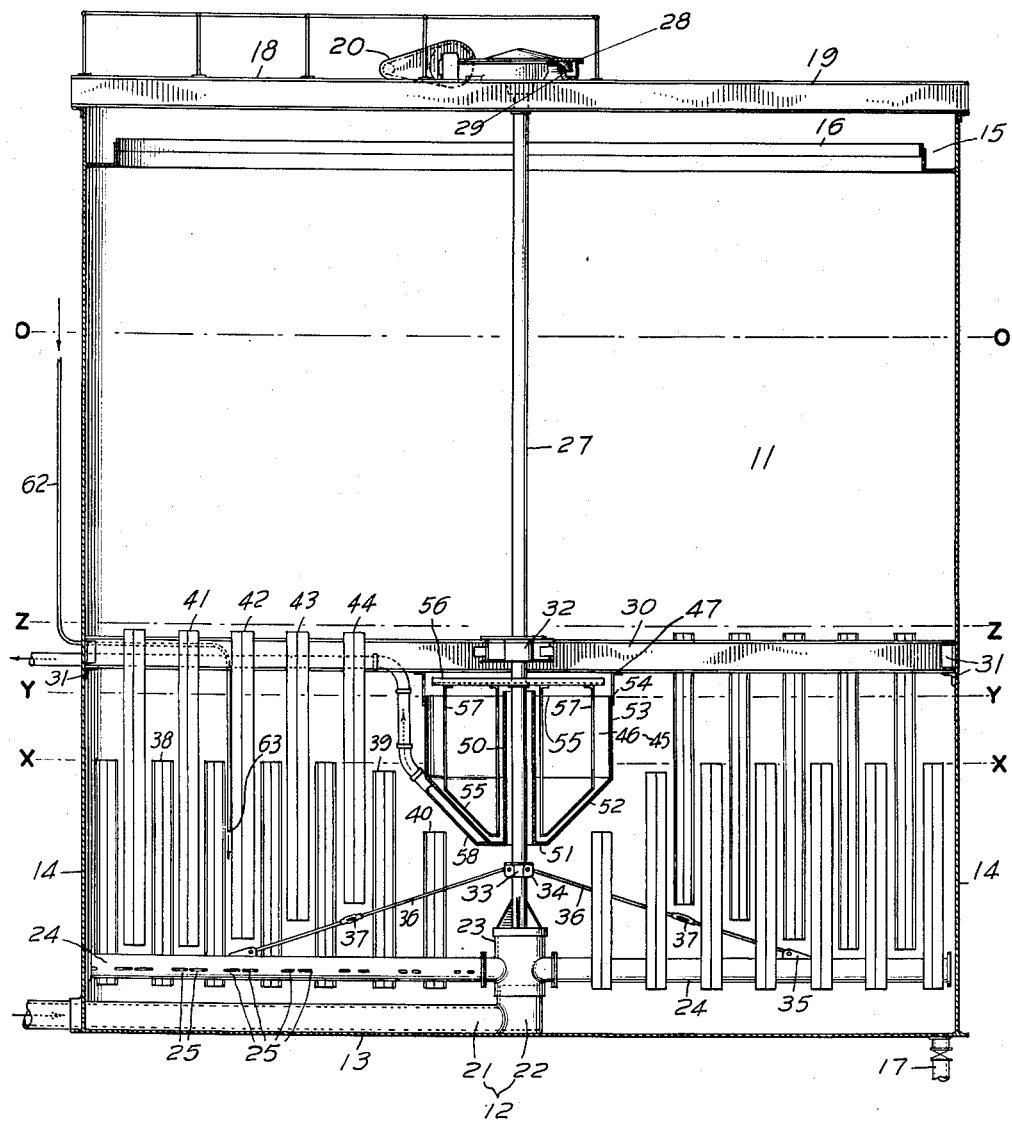

The chemical dosing is effected by means provided by the dosing supply pipe 62 having the discharge end 63 shown in Figs. 2 and 3 and in connection with this pipe, it will be noted that the discharge of reactive chemical or reagent therefrom is into a locality substantially below the upper limits of agitation, to wit, substantially below the line X—X. A substantial depth of relatively quiescent sludge or sludge blanket is maintained above the zone of agitation the absolute minimum of which depth of quiescent blanket is the vertical distance between the lines X—X and Y—Y. The elevation of the line Y—Y is determined by a suitable sludge withdrawal means which may be provided by a pocket section having a submerged weir at the elevation of the line Y—Y and a sludge withdrawal pipe leading from the pocket section to the exterior of the tank. The pocket providing means is designated by 46. The submerged weir referred to is designated by 54 and the sludge withdrawal pipe leading from the pocket is designated by 58 and is clearly shown in Figs. 2 and 3. In general, the approximate minimum depth for the sludge blanket and the maximum depth therefor will be the vertical distance between the lines X—X and Z—Z and the vertical distance between the lines X—X and O—O.

The clarified supernatant liquid will extend from variable locations normally between the lines Z—Z and O—O up to the overflow weir 16 which is located at the top of the tank. The general movement of the liquid within the tank is upward as the process proceeds. In starting up the tank the reactive chemical, or dosing agent as it may be called, combines with certain matter in the water, assuming it is water that is being treated for purification, and the precipitated reaction products coming into existence in that portion that is within the lowermost or agitation zone, the solids concentration gradually increases and builds up until a sludge not only exists within the agitation zone, but until it extends upwardly a substantial distance above the elevation indicated by the line X—X, to wit, to the level indicated by the line Y—Y which is the height of the submerged weir of the sludge withdrawal means. For the normal operation of the apparatus this line Y—Y indicates the lowest minimum level for the sludge. The scrubbing, so to speak, of the flowing liquid passing from the agitation zone is effected in the quiescent settling or sedimentation zone, to wit, in that portion of the quiescent sludge blanket which is above the line X—X which has for its absolute minimum elevation the line Y—Y, for its general operative minimum elevation line Z—Z and which may extend upwardly as high as the line O—O.

As already indicated, with certain solids there is an agglomeration thereof into larger particle sizes; with other solids there is a flocculation which is carried out and realized until flocs have grown from nuclei or small floc sizes into larger flocs and into relatively dense groups or colonies thereof. It has also been pointed out herein that if a flocculation operation is required in the agitation zone, then the maximum speed of movement of the agitating or agglomerating blades relative to the water which is being impelled thereby should not be greater than 1.5 ft. per second, while on the other hand if the agitation is primarily carried out for furthering or aiding reaction or for facilitating the agglomeration of crystalline particles, then the speed may considerably exceed that just indicated.

In order to drain the apparatus if such is desired, this is accomplished by the opening of the valve in the valve control pipe 17.

In case the treatment is for the purpose of removing only inorganics such as hardness from water, it will be observed that the process can be continued practically for an indefinite length of time as there is insufficient organic contaminating material which would tend to set up septic conditions.

By the operating of the apparatus and the carrying out of the process in the manner outlined, one is enabled by the controllable release of sludge from the bottom agitated zone to which fed liquid is supplied to maintain a sludge bed of the maximum density desirable, particularly of a much greater density than has heretofore been realized. By this means such separation of clear liquid from the sludge blanket takes place that no mechanical divisions or sludge rakes therefor are needed to lie between the agitated and quiescent zones, heretofore thought essential. Moreover, by the use of laterally and horizontally deflecting agitation blades there is no tendency to cause upward migration of solids that the sludge blanket cannot counteract.

In connection with the area of the cone 53, we have found it satisfactory to make use of the following relationship; namely, the area of the cone is to the area of the tank as the percentage of solids in the incoming feed is to the percentage of the solids in the flocculation zone.

We claim:

1. A unit for clarifying liquids comprising in operative combination a tank for holding a body of liquid providing therein a lower reaction section and a relatively quiescent contiguous overlying upper section that is in constant free hydraulic communication with the reaction section; tank feeding means for the lower section; effluent overflow weir means for releasing supernatant liquid from the upper portion of the overlying section in quantities substantially corresponding to the quantity of liquid feed to the lower section; means for impelling liquid in the lower section comprising horizontally-spaced upwardly-extending liquid-impelling blades turnable in horizontally-extending closed paths about a vertical axis; means comprising horizontally-spaced stationary deflector baffles extending downwardly from elevation higher than that of the upper ends of the impelling blades and disposed in overlapping relationship with respect thereto so as to permit an unobstructed movement of the impelling blades past the stationary baffles; means for supporting the deflector baffles; means providing an open top pocket whose top edge has elevation higher than that of the upper ends of the impelling blades but substantially below that of the normal surface level of the liquid of the body as determined by said overflow weir; sediment-raking and transferring means operable within the lower portion of the open top pocket; a conduit leading from the lower portion of the pocket for hydraulically passing therefrom to the exterior of the tank quantities of raked solids; and means for supporting and rotating the liquid-impelling blades.

2. A unit for employment in the clarifying of liquids according to claim 1, having a motivated structure turnable about the vertically-extending axis within the tank, comprising outwardly-extending arms disposed in the lower region of the agitated section and serving as carrier for the liquid-impelling blades and also comprising the sediment raking and transferring means that is operable within the lower portion of the pocket.

3. A unit for clarifying of liquids as defined in and by claim 1 in which the liquid impelling blades and the deflector baffles are of open-V-shape in transverse cross-section and are positioned so that the open portions of the V's of the impelling blades are trailingly disposed and so that the apex portion of the V's of the deflector baffles point toward the set of approaching impelling blades when the latter are in the immediate region of the deflector baffles.

4. A unit for clarifying liquids according to claim 1 with the addition of a horizontally-extending beam secured within the tank adapted for the support of the depending deflector baffles and the means providing the open top pocket.

5. A unit as defined in and by claim 1 in which the means providing the pocket is in the form of an open dish that is annular in cross-section so as to provide a vertically-extending central passageway, and with the addition of a vertical operating shaft extending through said central passageway, a motor and speed reducing and power transmission mechanism whereby said shaft can be actuated from said motor, a tubular liquid-distributing member deriving support from said shaft and embodying outwardly-extending apertured distributing arms that also serve to support the liquid-impelling blades; and in which there is included as a part of the feeding means a member by which the incoming liquid is delivered into said tubular distributing member.

6. A unit for clarifying liquids comprising in operative combination a tank for holding a body of liquid providing therein a lower reaction section and a relatively quiescent contiguous upper section that is in constant free hydraulic communication with the reaction section; tank feeding means for the lower section and for distributing it within said section; effluent overflow weir means for releasing supernatant liquid from an upper portion of the upper section; means for agitating liquid in the reaction section comprising horizontally-spaced upwardly-extending liquid-impelling blades turnable in horizontally-extending enclosed paths about a vertical axis and of which certain of the blades are of V-shape in cross-section with the wide portion of the V essentially open and trailingly disposed with respect to the forward narrow portion of the V; means for supporting and rotating the liquid-impelling blades; horizontally-spaced deflector baffles extending downwardly from elevation higher than that of the upper ends of the impelling blades disposed for horizontally-deflecting liquid impelled thereagainst substantially avoiding imparting vertical flow movement to the liquid impelled thereagainst and disposed in overlapping relationship with respect to said impelling blades to permit an unobstructed movement of the impelling blades past the stationary baffles; means for supporting the deflector baffles and a conduit leading from the lower section to the exterior of the tank for passing according to operative requirements quantities of liquid-solids mixture that would otherwise accummulate and extend into the upper relatively quiescent section.

GEORGE M. DARBY.
ANTHONY J. FISCHER.
WILLIAM C. WEBER.